United States Patent Office 3,743,588
Patented July 3, 1973

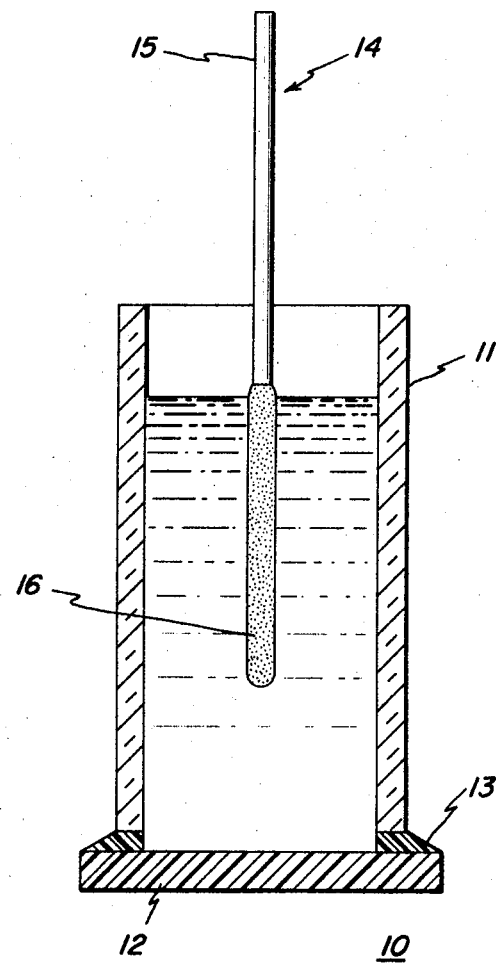

3,743,588
ION-SPECIFIC MEMBRANE
John F. Brown, Jr., George M. J. Slusarczuk, and Oliver H. Le Blanc, Jr., Schenectady, N.Y., assignors to General Electric Company
Filed Oct. 18, 1971, Ser. No. 190,344
Int. Cl. G01n 27/46
U.S. Cl. 204—195 M
4 Claims

ABSTRACT OF THE DISCLOSURE

An ion-specific membrane includes a hydrophobic elastomeric polymer with a dielectric constant of 4 to 13, and an ion-specific carrier. The hydrophobic elastomeric polymer is preferably an organopolysiloxane polycarbonate block copolymer. The ion-specific carriers include $H^+$ and $K^+$ ion carriers.

---

This invention relates to ion-specific membranes and, more particularly, to such ion-specific membranes comprising a hydrophobic elastomeric polymer and an ion-specific carrier.

Such ion-specific membranes are employed to measure specific ion responses. These membranes can be used in various types of sensors.

Ion-specific sensors are known in the prior art for measuring the hydrogen ion activity or pH of a sample or for measuring the potassium ion or other ion activities of a sample. An example of such a sensor is a pH sensor which employs a hydrogen ion-specific electrode, such as a glass electrode, and a reference electrode immersed in a solution, whereby the potential difference between the two electrodes is a function of the concentration of the hydrogen ion in the solution. The reference electrode contains a salt solution. Electrical connection between the salt solution and the sample solution is made generally by a liquid contact through an aperture referred to as a liquid junction.

Organopolysiloxane polycarbonate block copolymers, which are preferred in our present invention as hydrophobic elastomeric polymers, are described and claimed in U.S. Letters Patent 3,419,634 issued Dec. 31, 1968 and assigned to the same assignee as the present application.

Our present invention is directed to an improved ion-specific membrane which is suitable for biomedical, environmental control and other applications.

In accordance with one aspect of our invention, an ion-specific membrane has a hydrophobic elastomeric polymer with a dielectric constant of from 4 to 13, and an ion specific carrier.

These and various other objects, features and advantages of the invention will be better understood from the following description taken in connection with the accompanying drawing in which:

The single figure is a sectional view of a hydrogen ion-specific sensing electrode employing an ion-specific membrane made in accordance with our invention.

In the single figure of the drawing there is shown generally at 10 an ion-specific electrode employing an ion-specific membrane made in accordance with our invention. A tube 11 of non-ion-selective material, such as glass, has a disc 12 of ion-specific membrane sealed to one open end of glass tube 11 by a room temperature sealant 13 holding the edges of disc 12 against the exterior surface of tube 11. A silver wire 14 is positioned partially within tube 11 and extends outwardly from tube 11. Silver wire 14 has a portion of silver wire 15 and a portion 16 with silver chloride thereon.

We found that we could form an improved ion-specific membrane, which is useful for sensing a specific ion, from an elastomeric polymer with a dielectric constant of from 4 to 13, and an ion specific carrier. Suitable elastomeric polymers with a dielectric constant of from 4 to 13 include polyurethanes, chloroprene polymers, vinylidene fluoride-hexafluoropropylene polymers, and organopolysiloxane polycarbonate block copolymers with a dielectric constant of from 4 to 13. Such block copolymers are described and claimed in the above-identified U.S. Letters Patent 3,419,634. For example, suitable block copolymers with a dielectric constant of from 4 to 13 include phenoxysilicon linked cyanoethyl-methyl siloxane/bisphenol-A copolymer, siloxane-carbamate/PBA-carbonate copolymer with diisocyanatosiloxane, siloxane-carbamate/BPA-carbonate copolymer with a ratio of $$SiMe_2/SiMeEtCN = 3.3,$$

siloxane-carbamate/BPA-carbonate copolymer with a ratio of $SiMe_2/SiMeEtCN = 2.4$, siloxane-carbamate/PBA-carbonate copolymer with a ratio of $$SiMe_2/SiMeEtCN = 0.13,$$

and siloxane-carbamate/BPA-carbonate copolymer with a ratio of $SiMe_2/SiMe(EtCN) = 13$.

Suitable ion-specific carriers include $H^+$ ion carriers that are hydrophobic, lipophilic uncouplers, and include $K^+$ ion carriers. Suitable uncouplers include p-dodecyldinitrophenol, p-octadecyldinitrophenol, p-octadecyloxyphenylhydrazone mesoxalonitrile, and p-octadecyloxy-m-chloro-phenylhydrazone mesoxalonitrile. $H^+$ ion carriers that are hydrophobic lipophilic uncouplers are based upon compounds belonging to a class of substances known to uncouple oxidative phosphorylation in mitochondria and chloroplasts, and are therefore called uncouplers. Our carriers are such uncouplers which have been rendered hydrophobic and lipophilic by the addition of long alkyl hydrocarbon chains at appropriate places on the molecules. The carriers may be employed in the form of the simple acid or in various admixtures with hydrophobic, lipophilic salts of the acid such as tetraheptyl ammonium salts. Alternatively, the salt forming ion may be structurally incorporated into the polymer to completely prevent its transfer to the aqueous phase. Alternatively neutral hydrophobic, lipophilic salts such as tetraphenyl ammonium-tetraphenyl borate may be added to the polymer. One of the purposes of adding the salt forming species is to increase the conductivity of the membrane and thereby reduce interferences from electrical noise.

The following preparations were employed to produce organopolysiloxane polycarbonate block copolymers for use in preparing the membranes of our invention.

(1) Phenoxysilicon linked cyanoethyl-methyl siloxane/bisphenol-A copolymer.—A mixture of 15.7 g. of pentamethylcyanoethylcyclotrisiloxane (60 mmoles) and 1.3 g. of dimethyldichlorosilane (10 mmoles) and 20 mg. of ferric trichloride hexahydrate was stirred overnight under anhydrous conditions. An exothermic reaction was observed during the first minutes, accompanied by a strong viscosity increase; the viscosity dropped during later stages of the reaction. The resulting $\alpha,\omega$-dichloropolysiloxane was diluted with 10 cc. of anhydrous methylene chloride and added dropwise with stirring under anhydrous conditions to a solution of 6.85 g. of bisphenol-A (30 mmoles) and 7.8 cc. of dry pyridine in 60 cc. of methylene chloride. The mixture was stirred for about 30 minutes after completion of the addition; phosgene was then slowly passed into the solution until the viscosity rose sharply indicating the end of the reaction. The polymer solution was then washed twice with 10% hydrochloric acid and subsequently with water to neutrality. The product was recovered by precipitation into methanol. A yield of 17.2 g. was obtained, 70% of the theory. The NMR spectrum shows the presence of 4.7 $CH_3$—Si groups per ethylene; the ratio of siloxane groups to BPA-carbonate units is 1.75, corresponding to 64 wt. percent siloxane in the copolymer.

Analysis.—C—50.8, H—6.8, N—3.2, Si—22.4. Intrinsic viscosity: $\eta = 0.59$ dl./g.

(2) Siloxane-carbamate/BPA - carbonate copolymer with diisocyanatosiloxane.—A mixture of 44.5 g. of octamethylcyclotetrasiloxane, 22.5 g. of cyanoethylmethylcyclosiloxane (mixture of tri- to hexasiloxane) and 5.4 g. of 1,3-bis(4-aminobutyl)tetramethyldisiloxane was heated with about 20 mg. of solid sodium hydroxide under dry nitrogen at 170° overnight. A solution of 14 g. of the resulting homogeneous fluid is about 60 cc. of dry toluene was saturated with phosgene and then refluxed until all excess phosgene and hydrogen chloride were removed (about 5 hours). Toluene was stripped off, the residue dissolved in about 20 cc. of dry methylene chloride and a solution of 5 g. of bisphenol-A and 6 cc. of dry pyridine in 50 cc. of methylene chloride was added at once with stirring. Phosgene was now bubbled slowly into the stirred solution which toward the end of the reaction turned moderately viscous. The workup and recovery of the product were carried out as described in the previous example. A yield of 8 g. of polymer was obtained which could be cast into a clear rubbery film from chloroform solution.

(3) Siloxane-carbamate/BPA - carbonate copolymer, $SiMe_2/SiMeEtCN=3.3$.—A mixture of 25 g. of octamethylcyclotetrasiloxane (340 mmoles), 8.5 g. of cyanoethylmethylcyclosiloxane (mixture of tri- to hexasiloxane; 75 mmoles) and 5.4 g. of 1,3-bis(4-aminobutyl)-tetramethyldisiloxane (20 mmoles) was heated at 190° with about 10 mg. of sodium hydroxide under nitrogen for 15 hours. A solution of 20.5 g. of the resulting homogeneous fluid (10.5 mmoles) and 1.74 g. of pyridine (22 mmoles) in about 20 cc. of methylene chloride (dried with phosphorus pentoxide) was added over a period of 30 minutes to the stirred solution of 5.6 g. of bisphenol-A-bischlorocarbonate (15.9 mmoles) in 20 cc. of dry methylene chloride. Stirring was continued for another 30 minutes, then 3.6 g. of bisphenol-A (15.8 mmoles) and 5.3 g. of pyridine (67 mmoles) was added and a slow stream of phosgene was bubbled into the stirred solution until a sharp rise in the viscosity indicated the end of the reaction. About 10 cc. of methanol was quickly added in order to quench the reaction and prevent gel formation. The solution was diluted with about two times the volume of chloroform and washed three times with water. The product was recovered by addition to methanol. A yield of 23 g. was obtained.

(4) Siloxane - carbamate/BPA - carbonate copolymer, $SiMe_2/SiMeEtCN=2.4$.—As described in the previous example, an amine-end stopped siloxane fluid was prepared from 22.4 g. of dimethylsiloxane cyclic (300 mmoles), 11.3 g. methylcyanoethylsiloxane cyclic (100 mmoles), and 5.4 g. of bisaminobutyldisiloxane (20 mmoles). As in Example 4, a portion of the products, 19.4 g., was reacted with 5.3 g. of BPA-bischlorocarbonate and 1.65 g. of pyridine and subsequently with 3.4 g. of BPA, 5.0 g. of pyridine and phosgene. The reaction product was precipitated by addition to methanol containing about 20% of water. A yield of 19.1 g. of a tough, colorless rubber was obtained.

(5) Siloxane - carbamate/BPA - carbonate copolymer, $SiMe_2/SiMeEtCN=0.13$.—A solution of 22.4 g. of siloxane fluid prepared from 290 mmoles of methylcyanoethylsiloxane cyclic and 20 mmoles of bisaminobutyldisiloxane was reacted with 6.1 g. of BPA-bischlorocarbonate and 1.91 g. of pyridine, and subsequently with 3.9 g. of BPA, 5.8 g. of pyridine and phosgene, as described in Example 3. The polymer was recovered by addition to methanol; a yield of 19.5 g. of light-tan-colored, tough rubber was obtained.

(6) Siloxane - carbamate/BPA - carbonate copolymer, $SiMe_2/SiMe(EtCN)=13$.—An aminobutyl end-stopped siloxane fluid was prepared by heating 29.5 g. of octamethylcyclotetrasiloxane (0.4 mole), 4.0 g. of cyanoethylmethylcyclosiloxane (0.035 mole), and 5.4 g. of 1,3-bis (4-aminobutyl)tetramethyldisiloxane (0.02 mole) with about 10 mg. of sodium hydroxide at 190° C. for 15 hours under nitrogen. This fluid was reacted first with 3.24 g. of pyridine (0.041 mole) and 10.6 g. of BPA-bischlorocarbonate (0.03 mole) in 80 cc. methylene chloride. BPA, 6.84 g. (0.03 mole), and 10.0 g. of pyridine were then added and the resulting mixture was phosgenated as described before. The polymer product was isolated and purified as in earlier examples. A yield of 42 g. of a colorless, tough rubber was obtained.

Composition, physical properties, and analytical data for the above copolymers 2–6 are set forth below in Table I.

TABLE I

| No. | Dielectric constant $\Sigma$ | Intrinsic viscosity[a] $\eta$, dl./g. | Weight percent siloxane in copolymer | Yield, percent[b] | Molar ratio $Me_2Si/Me(EtCN)Si$ | | Molar ratio, BPA/ siloxane segment | | Analysis | | | | | | | |
|---|---|---|---|---|---|---|---|---|---|---|---|---|---|---|---|---|
| | | | | | | | | | Calculated | | | | Found | | | |
| | | | | | Polymer | Starting material | Polymer | Starting material | C | H | N | Si | C | H | N | Si |
| 6 | 4.2±.4 | 0.92 | 60 | 71 | 13 | 12 | 4.8 | 3 | 49.2 | 7.2 | 1.8 | 23.8 | 49.6 | 7.5 | 1.6 | 22.2 |
| 3 | 5.5±.5 | 1.13 | 63 | 81 | 3.3 | 5.0 | 2.6 | 3 | 50.0 | 7.0 | 4.3 | 22.7 | 49.8 | 7.2 | 3.8 | 21.4 |
| 4 | 6.1±.6 | 0.78 | 63 | 65 | 2.4 | 3.0 | 2.75 | 3 | 50.6 | 7.0 | 5.9 | 21.6 | 50.5 | 7.1 | 4.3 | 20.7 |
| 5 | 12±1 | 0.79 | 62 | 77 | 0.13 | 0.14 | 3.5 | 3 | 55.1 | 6.5 | 8.3 | 16.3 | 53.6 | 6.4 | 8.2 | 16.5 |
| 2[c] | 5.2±1 | 0.3 | 52 | 42 | 2.2 | 3.2 | 9.3 | 5.7 | 53.5 | 6.4 | 3.7 | 18.7 | 54.9 | 6.6 | 3.2 | 17.0 |

[a] In $CHCl_3$, 25°.
[b] Twice-precipitated product.
[c] Prepared with diisocyanato siloxane II.

The following preparations were employed to produce $H^+$ ion carriers that are hydrophobic, lipophilic uncouplers for use in the specific membranes of the present invention. The analysis of each uncoupler is set forth.

(I) p-Dodecyldinitrophenol (I).—To a mixture of 25 ml. of 70% nitric acid, 35 ml. glacial acetic acid, and 30 ml. acetic anhydride was added, at 3.5° C. and with stirring, 26.2 g. (0.1 mole) of p-dodecylphenol dissolved in 40 ml. glacial acetic acid. The cold reaction mixture was allowed to warm up overnight.

The solvents were evaporated in vacuo, and the residue dissolved in benzene and washed with water. Addition of hexane caused a precipitate which was filtered off and discarded. The solution was chromatographed on silica gel using 10% benzene in hexane as eluant. The dinitrophenol was obtained as a viscous oil upon evaporation of the solvent.

Analysis.—Calc. for $C_{18}H_{28}N_2O_5$ (percent): C—61.3, H—8.0, N—7.9. Found (percent): C—62.5, H—7.4, N—7.9.

(II) p - Octodecyloxyphenylhydrazone mesoxalonitrile (II).—3.6 g. (0.01 mole) of p-octodecyloxaniline was dissolved in 250 ml. dimethylformamide (DMF), and 2.3 ml. (0.02 mole) of concentrated HCl was added with stirring. The mixture was cooled to 3° C., and 0.7 g. (0.01 mole) of sodium nitrite, dissolved in a small amount of DMF, was added drop by drop. Stirring continued for two hours, then a solution of 0.7 g. (0.01 mole) malononitrile and 1 ml. triethylamine in 25 ml. DMF was added. The mixture was left standing overnight.

The mixture was acidified with HCl, warmed to dissolve the precipitate, and left to cool in ice. Filtration afforded 4.0 g. (91%) of the product, a yellow solid. It was purified by recrystallization from methanol (M.P. 114° to 115° C.).

*Analysis.*—Calc. for $C_{27}H_{42}NO$ (percent): C—73.9, H—9.7, N—12.8. Found (percent) C—74.7, H—9.8, N—12.5.

(III) p - Octadecyloxy-m-chlorophenylhydrazone mesoxalonitrile (III).—To 8.6 g. (0.02 mole) of 3-chloro-4-octadecyloxyaniline hydrochloride suspended in 250 ml. DMF was added 2.3 ml. (0.02 mole) concentrated HCl, and the mixture was cooled to 3° C. With stirring 1.4 g. (0.02 mole) of $NaNO_2$ dissolved in DMF was added. Stirring was continued for an hour, then 1.4 g. (0.02 mole) of malononitrile dissolved in 10 ml. DMF was added. After 10 minutes of further stirring 6 ml. of trimethylamine was added. The mixture was allowed to warm up overnight.

The reaction mixture was acidified with HCl, the resulting precipitate was filtered, washed with water, and recrystallized from methanol. Yellow needles, M.P. 105.5° to 106° C.

*Analysis.*—Calc. for $C_{27}H_{41}ClNO$ (percent): C—68.5, H—8.74, Cl—7.49, N—11.84. Found (percent): C—68.4, H—8.4, Cl—7.8, N—11.8.

Examples of ion-specific membranes made in accordance with our invention are as follows:

EXAMPLES 1–9

Ion-specific membranes 1–9, which are Examples 1–9, were prepared from the above block copolymers and hydrophobic, lipophilic uncouplers by casting a film of the composition on a glass plate from a methylene chloride solution of the polymer and the compound. A circular portion of the composition was punched out and joined to the end of a glass tube having an internal diameter of about 1 centimeter with a silicone seal. The tube was filled with an aqueous chloride solution of 0.1 M potassium chloride buffered at pH 7, and a chlorided silver wire inserted as the internal electrode. This assembly was inserted in the solution to be measured along with a fiber-junction saturated calomel reference electrode (S.C.E.).

The potential difference between the central electrode and the S.C.E. reference was displayed on a recorder after voltage amplification. The variable input resistance to the electrometer shunted the electrodes. Membrane resistance was estimated by measuring the decrease in displayed potential as the shunt resistance was decreased. A shunted resistance of at least two powers of 10 higher used to measure "zero-current potentials." The $H^+$ ion response of various membranes are set forth below in Table II.

TABLE II

| Example number | Polymer | Carrier | Thickness (mm.) | Resistance [a] (ohm) | Response time (sec.) | Sensitivity (mv./pH) |
|---|---|---|---|---|---|---|
| 1 | 2 | 1.5% I | 0.15 | $1\times10^8$ | 60–120 | 54 |
| 2 | 2 | 0.9% II plus 2% TPA-TPB [b] | 0.12 | $1\times10^7$ | 30–60 | 59 |
| 3 | 4 | <1% II | 0.12 | $4\times10^7$ | <30 | 56 |
| 4 | 4 | 1% III | 0.12 | $7\times10^6$ | <30 | 58 |
| 5 | 4 | 3% III | 0.12 | $2\times10^7$ | <3 | 58–59 |
| 6 | 3 | 1% III | 0.19 | $6\times10^7$ | <30 | 56 |
| 7 | 5 | 1% III | 0.19 | $2\times10^7$ | 30–60 | 57 |
| 8 | 6 | 1% III | 0.21 | $4\times10^8$ | 30–60 | 58 |
| 9 | 4 | 1% III plus 1% HIII [c] | 0.18 | $2\times10^6$ | <30 | 59 |

[a] Area of each electrode approximately 0.7 cm.$^2$ Resistance base films: $10^8$–$10^9 \Omega$.
[b] TPA-TPB = tetraphenylarsonium$^+$ tetraphenylborate$^-$.
[c] HIII = salt of III with tetraheptyl ammonium$^+$.

EXAMPLE 10

A membrane, which is Example 10, was prepared in the manner set forth above in Examples 1–9 but was not made with a hydrophobic elastomeric polymer with a dielectric constant of from 4 to 13 in accordance with our invention. An organopolysiloxane polycarbonate block copolymer was selected which had a dielectric constant of 2.9, was hydrophobic and elastomeric. Hydrophobic, lipophilic uncoupler No. III from the above uncoupler preparation was employed. However, this membrane, when assembled and tested as described above in Examples 1–9 exhibited a resistance of $1\times10^{11}$ ohms and gave no response thereby showing its unsuitability as an ion-specific membrane.

While other modifications of the invention and variations thereof which may be employed within the scope of the invention have not been described, the invention is intended to include such as may be embraced within the following claims.

What we claim as new and desire to secure by Letters Patent of the United States is:

1. An ion-specific membrane comprising a hydrophobic elastomer-polymer with a dielectric constant of from 4 to 13, and a $H^+$ ion carrier which is an uncoupler known to uncouple oxidative phosphorylation in mitochondria and chloroplasts, said uncoupler being rendered hydrophobic and lipophilic.

2. An ion-specific membrane as in claim 1, in which the hydrophobic, lipophilic uncoupler is p-dodecyldinitrophenol.

3. An ion-specific membrane as in claim 1, in which the hydrophobic, lipophilic uncoupler is p-octadecyloxyphenylhydrazone mesoxalonitrile.

4. An ion-specific membrane as in claim 1, in which the hydrophobic, lipophilic uncoupler is p-octadecyloxy-m-chloro-phenylhydrazone mesoxalonitrile.

References Cited

UNITED STATES PATENTS 3,562,129  2/1971  Simon _____ 204—195 M
3,419,634  12/1968  Vaughn _____ 260—824 R TA-HSUNG TUNG, Primary Examiner U.S. Cl. X.R.

204—296; 260—824 R